United States Patent
Behr et al.

(10) Patent No.: US 6,611,722 B2
(45) Date of Patent: *Aug. 26, 2003

(54) CONTROL AND DATA TRANSMISSION INSTALLATION AND A PROCESS FOR THE TRANSMISSION OF SAFETY-RELATED DATA

(75) Inventors: Thorsten Behr, Horn-Bad Meinberg (DE); Karsten Meyer-Gräfe, Schloss Holte (DE)

(73) Assignee: Phoenix Contact GmbH & Co. KG, Blomberg (DE)

( * ) Notice: Subject to any disclaimer, the term of this patent is extended or adjusted under 35 U.S.C. 154(b) by 44 days.

This patent is subject to a terminal disclaimer.

(21) Appl. No.: 10/006,898

(22) Filed: Dec. 5, 2001

(65) Prior Publication Data

US 2002/0040252 A1 Apr. 4, 2002

Related U.S. Application Data

(63) Continuation of application No. 09/160,230, filed on Sep. 24, 1998, now Pat. No. 6,347,252.

(30) Foreign Application Priority Data

Sep. 26, 1997 (DE) .......................................... 197 42 716

(51) Int. Cl.$^7$ ............................................. G05B 19/18
(52) U.S. Cl. ........................ 700/3; 700/2; 700/4; 700/5; 709/208; 709/209; 709/211; 710/110; 710/126; 710/100
(58) Field of Search ................................ 700/2, 3, 4, 5; 709/208, 209, 210, 211; 710/100, 106, 107, 110, 126

(56) References Cited

U.S. PATENT DOCUMENTS

| | | | | |
|---|---|---|---|---|
| 3,717,844 | A | * | 2/1973 | Barret et al. .................... 367/2 |
| 5,357,625 | A | * | 10/1994 | Arends ........................ 710/10 |
| 5,966,304 | A | * | 10/1999 | Cook et al. ................... 700/82 |
| 6,044,305 | A | * | 3/2000 | Larson et al. ................. 700/87 |
| 6,061,599 | A | * | 5/2000 | Rhodehamel et al. .......... 700/2 |
| 6,069,926 | A | * | 5/2000 | Sekiya et al. ............... 375/357 |
| 6,076,952 | A | * | 6/2000 | Gretta et al. ................. 700/83 |
| 6,098,135 | A | * | 8/2000 | Fukui ......................... 710/113 |
| 6,101,566 | A | * | 8/2000 | Woods et al. ............... 710/315 |
| 6,111,888 | A | * | 8/2000 | Green et al. ................ 370/461 |
| 6,347,252 | B1 | * | 2/2002 | Behr et al. ...................... 700/3 |

FOREIGN PATENT DOCUMENTS

| | | |
|---|---|---|
| DE | 37 06 325 | 8/1988 |
| DE | 40 32 033 | 4/1992 |

* cited by examiner

*Primary Examiner*—Ramesh Patel
(74) *Attorney, Agent, or Firm*—Charles E. Baxley

(57) ABSTRACT

A control and data transmission installation and a process for transmission of safely-related data in a control and data transmission installation. In accordance with the invention, safety procedures of existing field bus systems, particularly the interbus, are improved in such a way that there is no need either for additional lines for the transmission of control signals or redundant, safety-related units. In the inventive control and data installation, a master control device and a number of bus subscribers each include respective safety-related devices for carrying out predetermined safety functions. The safety-related devices can communicate with each other by way of a field bus.

11 Claims, 2 Drawing Sheets

Figure 1:
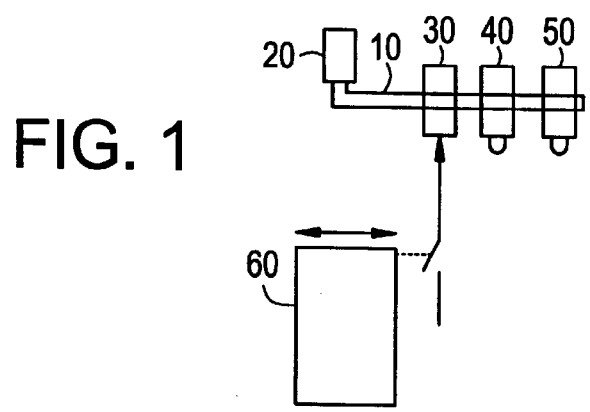

CONTROL AND DATA TRANSMISSION INSTALLATION AND A PROCESS FOR THE TRANSMISSION OF SAFETY-RELATED DATA

CROSS REFERENCE TO RELATED APPLICATIONS

The instant application is continuation application of parent application Ser. No. 09/160,230, now U.S. Pat. No. 6,347,252, entitled CONTROL AND DATA TRANSMISSION INSTALLATION AND A PROCESS FOR THE TRANSMISSION OF SAFETY-RELATED DATA, filed on Sep. 24, 1998, by Thorsten Behr et al., and which is incorporated herein by reference thereto for all purposes.

The invention concerns a control and data transmission installation as set forth in the classifying portion of claim 1 and a process for the transmission of safety-related data in such an installation as set forth in claim 11.

For a number of years the automation field has increasingly frequently seen the use of field bus systems to which input/output devices and a higher-order control device are connected. The cabling expenditure can be considerably reduced with such field bus systems as it is possible to save on copper lines. So that the field bus systems do justice to the necessary requirements in terms of safety procedures, certain safety functions, such as for example a stop function or an emergency off function, by which the field bus system can be put into a safe condition, must be implemented. In the previously known field bus systems the transmission of the control signals required for that purpose is respectively effected by way of parallel individual lines, that is to say not by way of the field bus itself. Other known approaches involve designing all those devices which are to perform safety functions in a suitably redundant mode. The known technologies suffer from the disadvantage that either a high level of redundant components is required, or individual parallel lines are needed for the transmission of the additional control signals.

The object of the present invention is therefore that of so improving the above-indicated control and data transmission installation with a serial field bus, that the above-specified disadvantages are avoided and the flexibility of the installation can be increased, insofar as safety-related units which are independent of manufacturer can be integrated in the installation in a simple fashion.

The invention attains that object on the one hand by means of the features of claim 1.

The core notion of the invention is that of providing a field bus system with safety functions which for example comply with category 3 or 4 respectively of the European Standard EN 954-1 (status 1996) and the classes of service requirements 4 and 6 respectively in accordance with DIN V 19250 (status May 1994).

For that purpose there is provided a control and data transmission installation have a serial field bus to which a master control device and a plurality of bus parties or subscribers, that is to say for example input/output devices, are connected. A respective safety-related device for the implementation of predetermined safety functions is arranged both in the master control device and also in the bus subscribers. The term safety-related device is used to denote a device which, substantially in response to status information in respect of the installation, performs predetermined safety functions which make it possible for the entire installation, predetermined units or portions of the installation to reach a safe condition. Safety functions include for example a stop function which can put the entire installation or given parts thereof into a safe condition, as rapidly as necessary. The emergency off function is also a safety function, with which the entire system can be put into a safe condition. Further safety functions involve for example the locking of doors, unintentional re-starting in the fault condition of the installation or a predetermined region, and other functions as defined for example in the European Standard EN 954-1. Unlike the state of the art wherein either redundant components are implemented for steps relating to safety procedures, or parallel lines are required for the transmission of the necessary control signals, the safety-related devices in accordance with the invention are implemented without redundancy in the master control device and in the bus subscribers and are capable of communicating with each other by way of the field bus itself.

Each bus subscriber is connected to the field bus by way of a bus connecting device. The bus connecting device can have an ASIC-component in which the data transmission protocol is implemented. The data transmission protocol can be for example the interbus protocol if an interbus is used as the field bus. The bus connecting device serves to transmit by way of the field field, the safety-related data which are to be exchanged between the safety-related devices, in the useful data fields of predetermined data frames. If an interbus protocol is used, the data frame is a sum frame in which the useful data of all connected bus subscribers are contained. Throughout the description and the claims the expression safety-related data is used to denote data which represent the safety condition of the respective bus subscriber or also the master safety device. The safety conditions of a bus subscriber are detected by monitoring devices, in particular sensors, which are associated with the units to be safeguarded which are connected to the respective bus subscriber. For example a sensor detects the speed of rotation of a machine. In that case the safety-related data indicate whether the speed of rotation of the machine is in the tolerance range or has exceeded a critical speed. It is possible that the master control device and the bus subscribers embed the safety-related data to be transmitted into the useful data fields of the respective bus subscriber so that the useful data intended for the master control device and the safety-related data of the bus subscriber can be transmitted in the same bus cycle. In addition it is also possible to envisage the safety-related data of a bus subscriber being transmitted in the useful data field during a separate bus cycle.

In a preferred development the safety-related device of each bus subscriber and/or of the master control device has at least one input which is connected to the monitoring device, for example a sensor. The design configuration of the safety-related device is such that it negates the output signal of the monitoring device and produces from the output signal and/or the negated output signal thereof an item of check information which together represent the items of safety-related information of the respective bus subscriber, which are to be transmitted. In that way the degree of installation safety can be further increased as, in the event of defective transmission of the safety-related data, the correct information can be obtained either from the negated data or from the check sum. This procedure makes it possible to achieve a bit error probability of $10^{-13}$.

In per se known manner each bus subscriber and/or the master control device has at least one output which is connected to a device to be safeguarded. As already mentioned, the devices to be safeguarded may be robots, machines and the like.

In accordance with an advantageous development each output is connected by way of a switch to the bus connecting device and directly to the safety-related device of the respective bus subscriber and/or the master control device. The safety-related device opens or closes the switch in dependence on the output signal of the monitoring device associated with a device to be safeguarded. In other words, the device to be safeguarded is put into a safe condition, that is to say it is disconnected from the installation if a fault has occurred. It should already be mentioned at this point that the safety function which is to be performed as a consequence of a detected fault is effected either by the output signal of the respective monitoring device or it is triggered by suitable safety-related data which are produced by the master control device and which are transmitted to the safety-related device of the respective bus subscriber.

In accordance with an advantageous development associated with the master control device is a higher-order control unit which can trigger one or more predetermined safety functions in dependence on the safety-related data of the bus subscribers. Thus for example, depending on the nature of the fault ascertained in a bus subscriber, either the devices to be safeguarded, which are connected to that bus subscriber, on their own, predetermined regions of the installation, or even the entire installation, can be switched off.

So that the master control device can read the safety-related data of the bus subscribers out of the data frame, it has a receiving device, an evaluation device for evaluation of the received safety-related data, and a device which, in response to the evaluated data, produces new safety-related data which are intended for the respective bus subscriber and which correspond to a predetermined safety function. In addition the design configuration of the receiving device is such that it can receive the safety-related data, the negated data thereof, and the items of check information, which are formed therefrom, in respect of the respective bus subscriber, and that the data-producing device can produce new safety-related data, the negated data thereof, and a new item of check information formed therefrom, and can transmit same in the useful data field of a data frame to the respective bus subscriber.

The object of the invention is also attained by the process steps of the process claimed in claim 11 for the transmission of safety-related data in a control and data transmission installation.

Advantageous developments are recited in the appendant claims.

Figure 2:
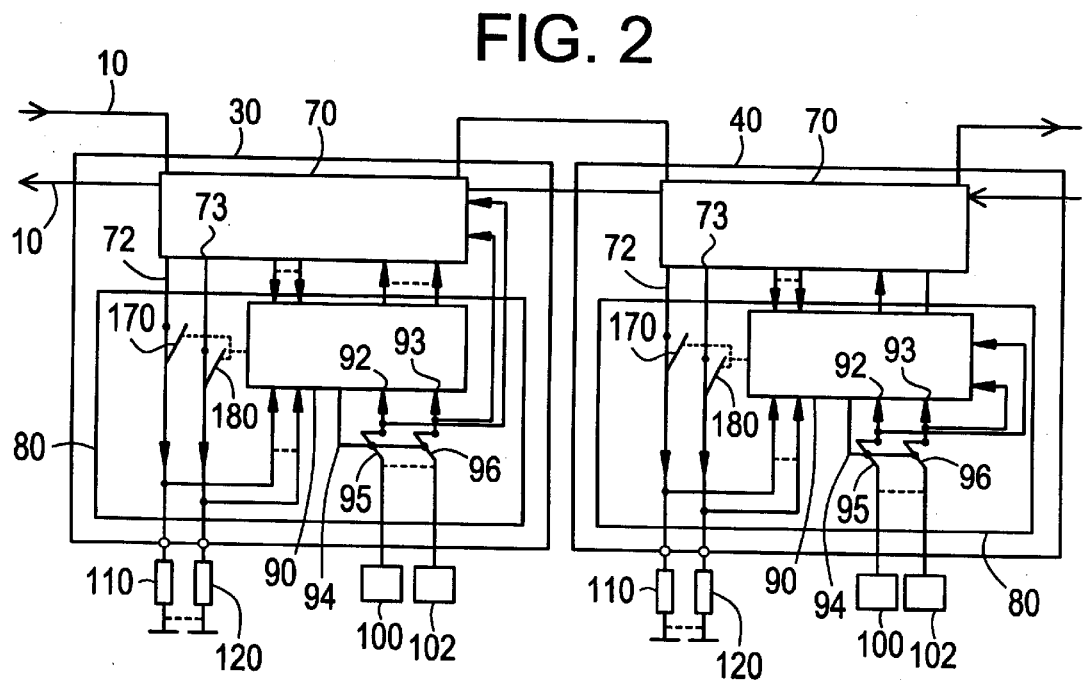
Figure 4:
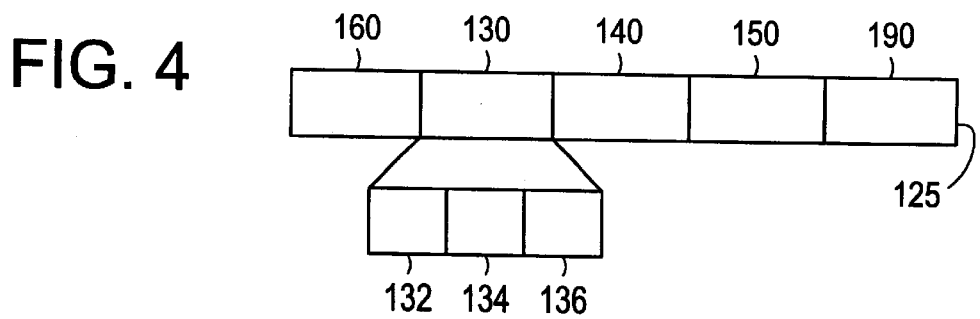
Figure 3:
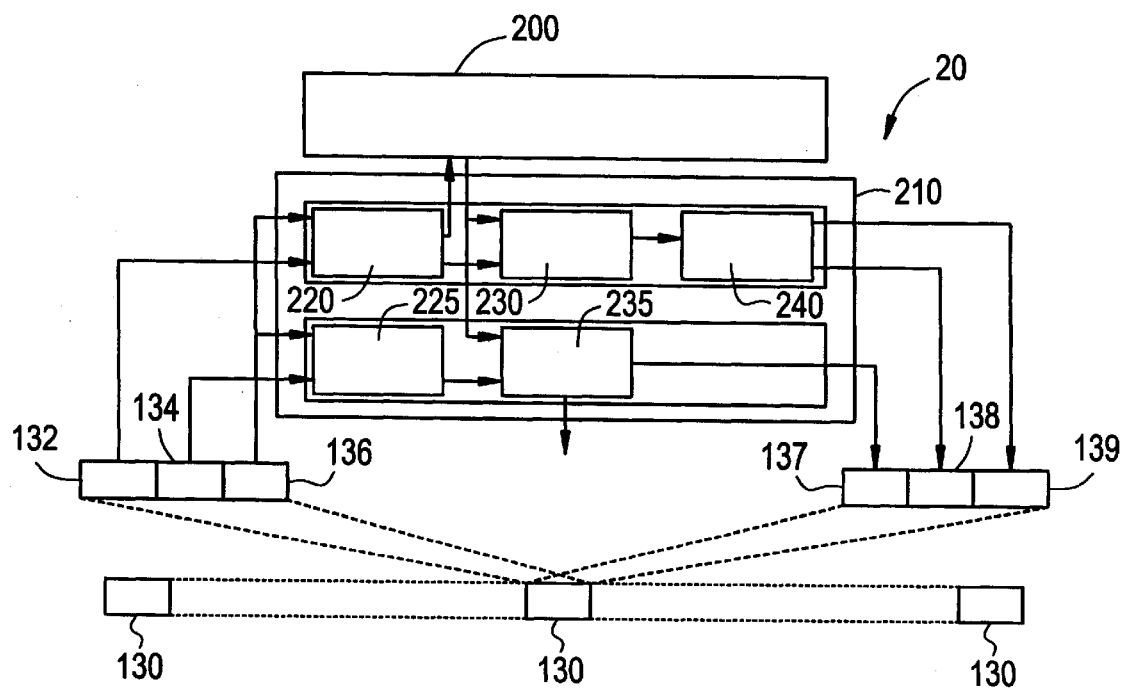

The invention is described in greater detail hereinafter by means of an embodiment with reference to the accompanying drawings in which:

FIG. 1 shows a greatly simplified block circuit diagram of a control data-transmission installation in which the invention is embodied, FIG. 2 shows the block circuit diagrams of two bus subscribers as shown in FIG. 1, in which the safety-related device according to the invention is implemented, FIG. 3 shows the block circuit diagram of the master control device shown in FIG. 1, with the safety-related device according to the invention, and FIG. 4 shows a data frame by way of example, in which safety-related information of a bus subscriber is contained.

FIG. 1 shows by way of example an interbus system for a control and data transmission installation, as is described in the specialist literature "Interbus-S, Grundlagen und Praxis" (translation: "Interbus-S, Principles and Practice"), Huhtig Buchverlag, Heidelberg 1994, by Alfredo Baginsky et al. Connected to the interbus 10 are a master control device 20 and three bus subscribers 30, 40 and 50. It should be expressly pointed out that this is an embodiment which is given by way of example, while the invention can be applied to other field buses and to systems comprising a plurality of interconnected field buses. The bus subscriber 30 is connected to a per se known protective grid 60 for monitoring machines, robots and the like which are connected to the bus subscriber 30.

FIG. 2 shows the bus subscribers 30 and 40 in greater detail in block circuit diagram form. As the circuitry structure of the bus subscribers is substantially identical, only the structure of the bus subscriber 30 will be described in greater detail. The bus subscriber 30 is connected to the interbus 10 by way of a bus connecting device 70. The bus connecting device 70 can have an ASIC-component on which the per se known interbus data transmission protocol is implemented. In addition, a safety-related circuit arrangement 80 is implemented in the bus subscriber 30 and can deal with monitoring the bus subscriber 30 in respect of safety procedures, in accordance with the invention. The safety functions which the safety circuit arrangement 80 can perform are already defined in various standards. In addition all conceivable safety functions can be embodied by the safety-related circuit arrangement 80. For that purpose the safety-related circuit arrangement 80 has a safety component 90 in which a predetermined safety protocol which can be known per se is implemented. The safety component 90 for example performs regular self-tests in conformity with EN 954-1. For that purpose, an output line 94 is connected to switches 95 and 96 by way of which the sensors 100 and 102 respectively are connected to the inputs 92 and 93. This kind of self-test is known per se. The safety component 90 has for example two inputs 92 and 93 which are connected to a sensor 100 and 102 respectively, which are associated with devices to be monitored. For example the sensor 100 monitors the speed of rotation of a lathe 110 and the sensor 102 monitors a welding robot 120. The protective grid 60 shown in FIG. 1 can also be connected to the inputs of the safety component 90. As already shown the output of the sensor 100 is connected to the input 92 of the safety component 90 and directly to an input of the bus connecting device 70. In a similar fashion, the output of the sensor 102 is connected to the input 93 of the safety component 90 and directly to an input of the bus connecting device 70. The safety component 90 serves to negate the input data coming from the sensors 100 and 102, hereinafter referred to as the actual safety-related data, and to feed same as safety-related negated data to the bus connecting device 70. In addition the safety component 90 produces an item of check information from the negated safety-related data and/or from the non-negated safety-related data, and that check information is also fed to the bus connecting device 70. The safety-related data, the negated safety-related data and the check information form the safety-related information. That arrangement provides for improving the safety performance of the interbus system as the level of data transmission safety and security is increased. It will be appreciated that it is possible for only the safety-related data to be fed to the bus connecting device 70. It should once again be mentioned that the safety-related data involve the actual condition or status data of the bus subscriber 30, more specifically the condition or status data of the devices 110 and 120 to be safeguarded, which are connected thereto. The bus connecting device 70 produces a conventional data frame, in the example of the interbus system a sum frame, in which the input date of the connected bus subscribers 30, 40 and 50, which are to be transmitted to the master control device 20, are successively contained.

FIG. 4 shows by way of example an interbus sum frame 125 which contains for example a so-called loop-back word which the master control device 20 has produced. A further field is allocated to the check sum. The useful data of the bus subscriber 30, 40 and 50 respectively are contained in the fields 130, 140 and 150. The sum frame 125 is transmitted in a bus cycle to the master control device 20. Now, in accordance with the invention the bus connecting device 70 is to perform the function of writing the safety-related items of information of the bus subscriber 30 into the field 130 associated therewith. In our example, the safety-related data of the sensors 100 and 102 are written into the field 132, the negated safety-related data are written into the field 134 and the calculated check information is written into the field 136. It should be noted that the safety-related data in the fields 132, 134 and 136 either occupy the entire useful data field 130 of the bus subscriber 30 and are transmitted in a separate bus cycle, or however they only occupy a part of the useful data field 150 and can thus be transmitted together with the useful data of the bus subscriber 30 in the same bus cycle, to the master control device 20. That can provide for more effective data transmission. The bus subscribers 30, 40 and 50 can not only transmit safety-related information to the master control device 20 but in opposite relationship can also receive safety-related data or information from the master control device 20. For that purpose the bus connecting device 70 reads out of a useful data field of a sum frame, the items of safety-related information which are intended for the bus subscriber 30 and which again comprise the actual safety-related data, the negated safety-related data and an item of check information, all of which are produced in the master control device 20, as will be further described hereinafter. The bus connecting device 70 has for example two outputs 72, 73. The lathe 110 is connected to the output 72 by way of a switch 170 and the welding robot 120 is connected to the output 73 by way of a switch 180. If necessary the lathe 110 and the welding robot 120 can be separated from the interbus system by way of the switches 170 and 180. In particular control data and process and parameter data can be transmitted to the lathe 110 and the welding robot 120 or parameter and process data can be transmitted from same to the bus connecting device, by way of the switches 170 and 180. The outputs of the switches 170 and 180 are connected to the safety component 90. The bus connecting device 70 is also connected to the safety component 90 in order to supply same with the items of safety-related information received from the master control device 20. The safety-related data received from the master control device 20 correspond to predetermined safety functions which are performed by the safety component 90. For that purpose the safety component 90 is also connected to the switches 170 and 180. The safety component 90 receives from the bus connecting device 70 the safety-related data coming from the master control device 20, negated safety-related data and the check information which it requires to ascertain the appropriate safety function. For example, the safety component 90 interprets the safety-related data coming from the master control device 20, to the effect that the speed of rotation of the lathe 110 has exceeded a critical value and that for example a person has moved into the safety region of the welding robot. Thereupon a predetermined safety function is triggered, which causes the switches 170 and 180 to be opened so that the lathe 110 and the welding robot 120 can be disconnected from the interbus

10. The level of safety and security of the system is further improved with the feedback of the outputs of the switches 170 and 180 to the safety component 90. Thus it is possible for the safety-related information coming from the master control device 20 to be falsified in such a way that they reflect a fault-free condition. In actual fact however faults have occurred in the lathe 110 and the welding robot 120. Due to the fed-back outputs of the switches 170 and 180, the safety component 90 is capable of comparing the actual condition or status values with the safety-related information received from the master control device 20, and opening the switches 170 and 180 or keeping them open, if the data are not in conformity with each other.

The safety component 90 can include further steps and measures in conformity with EN 954-1, such as for example the above-mentioned self-test which is regularly carried out and a timer which for example opens the switches 170 and 180 after 40 ms in order to switch the lathe 110 and the welding robot 120 into a safe condition if no valid safety-related data have been recognised.

FIG. 3 shows a block circuit diagram of the master control device 20 shown in FIG. 1. It will be appreciated that only the features that are essential features of the invention are illustrated herein. The master control device 20 includes a higher-order control unit 200, the function of which will be described in greater detail hereinafter. In addition a safety-related circuit arrangement 210 is implemented in the master control device 20. Furthermore the master control device 20 has a receiving device (not shown) which can read the safety-related information of the bus subscribers 30, 40 and 50 out of the useful data fields of a received sum frame, for example the sum frame 125 shown in FIG. 4. The safety-related data of the subscriber 30, which are transmitted in the useful data field 130, are considered by way of example. The receiving device feeds the actual safety-related data which are contained in the sub-field 132 to a first check circuit 220. The negated safety-related data contained in the sub-field 134 are fed to a second check circuit 225. The check information transmitted in the sub-field 136 is fed both to the check circuit 220 and also to the check circuit 225. The check circuits 220 and 225 evaluate the received data. The check circuit 220 which processes the actual safety-related data is connected to a logic circuit 230 and feeds its output data to the higher-order control unit 200 while the check circuit 225 is connected on its output side to a logic circuit 235. In response to the output signal of the check circuit 220 the higher-order control unit 200 produces a control signal which is dependent on the safety-related data of the bus subscriber 30 and which is fed to the logic circuit 230 and the logic circuit 235. From the output signal of the check circuit 225 and the control signal of the higher-order control device 200, the logic circuit 235 produces the actual safety-related data which are intended for the bus subscriber 30. From the control signal of the higher-order control unit 200 and the output data of the check circuit 220, the logic circuit 230 ascertains an output signal which is fed to a circuit 240 which supplies an output signal corresponding to the negated safety-related data of the logic circuit 235. The circuit 240 also produces either an item of check information from the negated safety-related data and/or from the actual safety-related data. The actual safety-related data, the negated safety-related data and the item of check information, which are summarisingly referred to as safety-related information, are again written by the safety-related circuit arrangement 210 into the useful data field of a sum frame which is intended for the bus subscriber 30. The master control device 20 is also capable of processing the items of safety-related information of all connected bus subscribers 30, 40 and 50 in that way and writing them into the corresponding useful data fields of a sum frame.

Under the control of the higher-order control unit 200, during each bus cycle or in predetermined bus cycles, the safety-related circuit arrangement 210 of the master control device 200 can transmit predetermined, that is to say clearly defined, items of safety-related information in the useful data fields of a sum frame, which are associated with the bus subscribers 30, 40 and 50, to the bus subscribers 30, 40 and 50. The safety-related devices 80 of the bus subscribers 30, 40 and 50 are of such a configuration that, in response to the actual condition of the respective bus subscriber or the condition of the input/output devices connected to the bus subscriber, they can return the received predetermined safety-related data to the master control device 20, in a changed or unchanged state. The master control device 20 compares the bus subscriber-specific, safety-related information received in the useful data fields of the sum frame, to the predetermined safety-related information. If the items of safety-related information are the same, no safety functions are triggered. If of course the received safety-related information does not coincide with the predetermined safety-related information, then, under the control of the higher-order control unit 200, the safety-related circuit arrangement 210 can immediately produce suitable items of safety-related information which correspond to corresponding safety functions. Those items of safety-related information are either used by the safety-related circuit arrangement 210 of the master control device 20 in order for example to trigger off an emergency off function which puts the entire system into a safe condition. On the other hand, it is possible that those items of safety-related information are transmitted to the connected bus subscribers 30, 40 and 50 whose safety-related arrangements 70 trigger the respective safety functions, in response to the received items of safety-related information. In order to improve the level of safety and security of the entire system, the predetermined safety-related information can be transmitted a second time to the bus subscribers 30, 40 and 50 which then again, in dependence on their condition or state, send those items of predetermined safety-related information back to the master control device 20, in a changed or unchanged state.

By virtue of the invention with which the safety measures are implemented on the one hand in the master control device 20 and on the other hand in each bus subscriber 30, 40 and 50 respectively, wherein the safety-related data or items of information are transmitted in the useful data fields of the interbus sum frame, it is possible for the system to be enlarged at any time with manufacturer-independent structural units, and for the application which is being carried into effect in the higher-order control unit 200 to be altered, without the functions in terms of safety procedures being adversely affected thereby.

What is claimed is:

1. A control and data transmission installation, including:
   a serial field bus; and
   a master control device and a plurality of bus subscribers connected to the serial field bus, wherein
   the master control device includes one of a set of safety-related devices, each of the bus subscribers includes an other one of the set of safety-related devices and the safety-related devices are configured to carry out predetermined safety functions and to communicate with each other via the serial field bus;
   wherein each of the bus subscribers is connected to the serial filed bus by a bus connecting device configured to implement a data transmission protocol;
   wherein the bus connecting devices transmit safety-related data which are to be exchanged between the safety-related devices and which represent the safety condition of the respective bus subscribers, in accordance with the data transmission protocol, via the serial field bus in useful data fields of predetermined data frames;
   wherein said one of the safety-related devices included in the master control device has a receiving device for receiving the safety-related data of each of the bus subscribers, an evaluation device for evaluating the received safety-related data and a device which, in response to the evaluated data, produces new safety-related data, which are intended for the respective bus subscriber and which correspond to a predetermined safety function;
   wherein each of the bus subscribers and/or the master control device has at least one output connected to a device to be safe guarded.

2. A control and data transmission installation according to claim 1 wherein each of the safety-related devices has at least one input connected to a monitoring device; and
   wherein said each of the safety-related devices is configured to negate an output signal of the monitoring device and to produce from the output signal and/or its negated output signal an item of check information representing the safety-related data to be transmitted.

3. A control and data transmission installation according to claim 1 wherein each said output is connected by a switch to one of the bus connecting devices and directly to the safety-related device of the respective bus subscriber and/or the master control device.

4. A control and data transmission installation according to claim 3, wherein each of the safety-related devices has at least one input connected to a monitoring device, and said each of the safety-related device opens or closes the switch in response to the output signal of the corresponding monitoring device.

5. A control and data transmission installation according to claim 1, wherein said one of the safety-related device included in the master control device has a receiving device for receiving the safety-related data of each of the bus subscribers, an evaluation device for evaluating the received safety-related data and a device which, in response to the evaluated data, produces new safety-related data which are intended for the respective bus subscriber and which correspond to a predetermined safety function.

6. A control and data transmission installation according to claim 5, wherein each of the safety-related devices has at least one input connected to a monitoring device;
   wherein said each of the safety-related devices is configured to negate an output signal of the monitoring device and to produce from the output signal and/or its negated output signal an item of check information representing the safety-related data to be transmitted;
   wherein the receiving device is adapted to receive the safety-related data, the negated data thereof and the check information; and
   wherein the producing device is adapted to produce the new safety-related data, the negated data thereof and a new item of check information.

7. A control and data transmission installation according to claim 1, wherein the serial field bus is an interbus in accordance with DIN 19258 and each of the data frames is a sum frame which contains input or output data of each of the bus subscribers.

8. A control and data transmission installation according to claim 1, wherein the master control device is a higher order control unit which triggers one or more predetermined safety functions in dependence on the safety-related data of the bus subscribers.

9. A process for transmission of safety-related data in a control and data transmission installation, wherein the control and data transmission installation includes a serial field bus and bus subscribers and a master control device connected to the serial field bus, wherein the process includes the steps of:

(a) implementing a data transmission protocol and a safety protocol for carrying out predetermined, installation-specific safety functions in each of the bus subscribers and in the master control device;

(b) wherein the safety protocol produces, in response to output signals of a monitoring device associated with each of the bus subscribers, safety-related data which reflect the condition of the respective bus subscriber and transmits the same to a bus connecting device configured to implement the data transmission protocol;

(c) wherein the bus connecting device transmits the safety-related data of the respective bus subscriber, in accordance with the data transmission protocol, in a useful data field of at least one predetermined data frame via the serial field bus to the master control device;

(d) wherein, in implementing the safety protocol, the master control device receives the safety-related data from the bus subscriber, produces in dependence thereon new safety-related data which correspond to a predetermined safety function, and transmits the new safety-related data in a useful field of a data frame back to the corresponding bus subscriber; and (e) wherein, in implementing the safety protocol, in response to the new safety-related data, the bus subscriber performs the predetermined safety function.

10. A process according to claim 9, wherein, in step b) the safety protocol negates the safety-related data and forms an item of check information from the safety-related data and/or the negated safety-related data and in step d), new safety-related data, new negated safety-related data, and a new item of check information are produced from the received safety-related data, the negated data thereof, and the check information.

11. A process according to claim 9 or claim 10 wherein during each of a number of bus cycles the master control device transmits predetermined safety-related data to the connected bus subscribers, and in dependence on their safety condition the bus subscribers produce safety-related data and send the same back to the master control device, wherein the master control device compares emitted predetermined safety-related data to the safety-related data received from each of the bus subscribers and triggers predetermined safety functions if a result of the comparison is negative.

* * * * *